US012800899B2

(12) United States Patent
Yeh et al.

(10) Patent No.: US 12,800,899 B2
(45) Date of Patent: Nov. 17, 2026

(54) MICROSCOPE DEVICE AND LIGHT SOURCE SET FOR MAKING OBSERVED MAGNIFIED IMAGE BRIGHTER AND MORE CLEAR

(71) Applicant: Aidmics Biotechnology Co., Ltd., Taipei City (TW)

(72) Inventors: Chang-Ching Yeh, Taipei City (TW); Chang-Yu Chen, Taipei City (TW); Shu-Sheng Lin, Taipei City (TW)

(73) Assignee: Aidmics Biotechnology Co., Ltd., Taipei City (TW)

(*) Notice: Subject to any disclaimer, the term of this patent is extended or adjusted under 35 U.S.C. 154(b) by 494 days.

(21) Appl. No.: 18/482,378

(22) Filed: Oct. 6, 2023

(65) Prior Publication Data

US 2024/0118528 A1 Apr. 11, 2024

(30) Foreign Application Priority Data

Oct. 7, 2022 (TW) .................................. 111138313

(51) Int. Cl.
*G02B 21/06* (2006.01)
*G02B 21/36* (2006.01)

(52) U.S. Cl.
CPC ........... *G02B 21/06* (2013.01); *G02B 21/362* (2013.01)

(58) Field of Classification Search
CPC .............................. G02B 21/06; G02B 21/362
USPC .......................................................... 359/390
See application file for complete search history.

(56) References Cited

U.S. PATENT DOCUMENTS

| | | | | |
|---|---|---|---|---|
| 2006/0215400 A1* | 9/2006 | Lewis | ................ | G01N 21/8806 362/276 |
| 2017/0045724 A1* | 2/2017 | Lin | .................... | G02B 21/0008 |
| 2021/0137633 A1 | 5/2021 | Mullani et al. | | |

FOREIGN PATENT DOCUMENTS

| | | | | |
|---|---|---|---|---|
| CN | 214335361 U | 10/2021 | | |
| JP | 2006081842 A | 3/2006 | | |
| JP | 2016505890 A | 2/2016 | | |
| TW | 201706672 A | 2/2017 | | |
| WO | WO-2017132678 A1 * | 8/2017 | ............. | G02B 7/021 |

* cited by examiner

*Primary Examiner* — Sharrief I Broome
(74) *Attorney, Agent, or Firm* — MUNCY, GEISSLER, OLDS & LOWE, P.C.

(57) ABSTRACT

The microscope device includes an objective lens unit and a light source set. The light source set includes a circuit substrate, a battery and a light-emitting unit. The circuit substrate has a power source portion and a light source portion electrically connected to the power source portion. A connecting member and the battery are arranged at opposite sides of the power source portion. The light-emitting unit is arranged on the light source portion, and the distance between the light-emitting unit and the center axis of the optical route is greater than the radius of the objective lens unit. The battery activates the light-emitting unit to generate a light beam irradiating toward the center axis of the optical route of the microscope device. The light source set can provide light to the to-be-observed sample for making the observed magnified image bright and clear, thereby improving the experience of observing samples.

15 Claims, 8 Drawing Sheets

MICROSCOPE DEVICE AND LIGHT SOURCE SET FOR MAKING OBSERVED MAGNIFIED IMAGE BRIGHTER AND MORE CLEAR

CROSS REFERENCE TO RELATED APPLICATIONS

This Non-provisional application claims priority under 35 U.S.C. § 119(a) on Patent Application No(s). 111138313 filed in Taiwan, Republic of China on Oct. 7, 2022, the entire contents of which are hereby incorporated by reference.

BACKGROUND

Technology Field

The present disclosure relates to a microscope device and a light source set applied to the microscope device.

Description of Related Art

Generally, a traditional microscope mostly refers to an optical microscope, which is used to observe microorganisms, cells or fine structures of some substances. The microscope utilizes one or more lenses to magnify the sample image and send the magnified sample image to viewer's eyes or an image apparatus for observation.

In recent years, with the popularization of smart communication devices (e.g. mobile phones) and the enhancement of the camera function of the smart communication devices, there are many commercial microscope devices on the market that can be used and cooperated with the camera lens of the smart communication device to observe a target sample, so as to carry out a portable minimized microscope device.

Although the conventional portable minimized microscope device can effectively reduce the volume of overall structure to achieve the goal of miniaturization, and can observe a target sample along with the camera of the smart communication device, however, when observing the target sample, the distance between the sample and the objective lens unit of the microscope device is very small, which may cause the insufficient light for the sample. This insufficient light issue may make the observed magnified image too dark and not clear enough, thereby seriously affecting the experience of observing the sample.

SUMMARY

In view of the foregoing, an objective of this disclosure is to provide a microscope device and a light source set that can provide light to the sample so as to make the observed magnified image bright and clear, thereby improving the experience of observing samples.

To achieve the above, the present disclosure provides a microscope device for observing a sample, wherein the microscope device and the sample are located on an optical route. The microscope device includes an objective lens unit, a light source set, and a cover body. The light source set includes a circuit substrate, a battery and a light-emitting unit. The circuit substrate has a power source portion and a light source portion electrically connected to the power source portion, and a connecting member is arranged at one side of the power source portion. The battery is arranged at another side of the power source portion opposite to the connecting member, and the light-emitting unit is arranged on the light source portion. The distance between the light-emitting unit and a center axis of the optical route is greater than a radius of the objective lens unit. The cover body is annularly arranged around the optical route. The light source portion is located at an outer periphery of the cover body so that the light-emitting unit is arranged at the outer periphery of the cover body. The height of the cover body defines a distance between the objective lens unit and the sample, and one end of the cover body facing toward the sample is configured with an opening. The battery activates the light-emitting unit to generate a light beam, and the light beam irradiates toward the center axis of the optical route.

In one embodiment, the microscope device further includes a stationary fixture having a through hole, and the objective lens unit is fixed in the through hole.

In one embodiment, the microscope device further includes a cap body configured to cap the opening of the cover body, and the sample is disposed at one side of the cap body.

In one embodiment, the connecting member of the light source set is connected to the cover body or the stationary fixture by magnetics, clipping, engaging, or the likes.

In one embodiment, the light source portion of the circuit substrate has an arc shape or an annular shape, the light source portion with the arc shape or the annular shape is arranged at the outer periphery of the cover body, and the light-emitting unit includes a plurality of light-emitting elements separately disposed at one side of the light source portion.

In one embodiment, the light source portion with the arc shape approaches toward the outer periphery of the cover body in a lateral direction of the cover body, which is perpendicular to an axial direction of the cover body. In one embodiment, the light source portion with the annular shape is telescoped on the outer periphery of the cover body from top of the cover body in a direction parallel to the axial direction of the cover body.

In one embodiment, the light source portion of the circuit substrate has an arc shape or an annular shape, the light-emitting unit includes at least one light-emitting element and at least one light guiding element, the at least one light-emitting element emits the light beam into the at least one light guiding element, and then the at least one light guiding element outputs the light beam.

In one embodiment, the light source portion of the circuit substrate has an arc shape or an annular shape, and the light-emitting unit includes a plurality of light-emitting elements separately disposed on the light source portion.

In one embodiment, the light-emitting elements are divided into multiple groups, and the multiple groups of the light-emitting elements are turned on/off individually.

In one embodiment, the circuit substrate is configured with a touch-control switch, the touch-control switch is arranged at a periphery of the light source portion, and a total length of the touch-control switch is greater than or equal to 1 cm.

In one embodiment, the circuit substrate includes a flange protruding from the light source portion, and the touch-control switch is arranged on the flange.

In one embodiment, the light source set further includes a power switch electrically connected to the battery for controlling the battery to output electric power to activate the light-emitting unit.

To achieve the above, this disclosure also provides a light source set, which is applied to a microscope device for observing a sample. The microscope device includes an objective lens unit for observing the sample and a cover body, and the microscope device and the sample are located on an optical route. The light source set includes a circuit substrate, a battery and a light-emitting unit. The circuit substrate has a power source portion and a light source portion electrically connected to the power source portion, and a connecting member is arranged at one side of the power source portion. The light source portion is located at an outer periphery of the cover body. The battery is arranged at another side of the power source portion opposite to the connecting member. The light-emitting unit is arranged on the light source portion. The distance between the light-emitting unit and a center axis of the optical route is greater than a radius of the objective lens unit. The battery activates the light-emitting unit to generate a light beam, and the light beam irradiates toward the center axis of the optical route.

In one embodiment, the light source portion of the circuit substrate has an arc shape or an annular shape, the light-emitting unit includes at least one light-emitting element and at least one light guiding element, the at least one light-emitting element emits the light beam into the at least one light guiding element, and then the at least one light guiding element outputs the light beam.

In one embodiment, the light source portion of the circuit substrate has an arc shape or an annular shape, the light source portion with the arc shape or the annular shape is arranged at the outer periphery of the cover body, and the light-emitting unit includes a plurality of light-emitting elements separately disposed at one side of the light source portion.

In one embodiment, the light source portion with the arc shape approaches toward the outer periphery of the cover body in a lateral direction of the cover body, which is perpendicular to an axial direction of the cover body. In one embodiment, the light source portion with the annular shape is telescoped on the outer periphery of the cover body from top of the cover body in a direction parallel to the axial direction of the cover body.

In one embodiment, the light-emitting elements are divided into multiple groups, and the multiple groups of the light-emitting elements are turned on/off individually.

In one embodiment, the circuit substrate is configured with a touch-control switch, the touch-control switch is arranged at a periphery of the light source portion, and a total length of the touch-control switch is greater than or equal to 1 cm.

In one embodiment, the circuit substrate includes a flange protruding from the light source portion, and the touch-control switch is arranged on the flange.

In one embodiment, the light source set further includes a power switch electrically connected to the battery for controlling the battery to output electric power to activate the light-emitting unit.

As mentioned above, the microscope device of this disclosure includes an objective lens unit, a light source set, and a cover body. The light source set includes a circuit substrate, a battery and a light-emitting unit. The circuit substrate has a power source portion and a light source portion electrically connected to the power source portion, and a connecting member is arranged at one side of the power source portion. The battery is arranged at another side of the power source portion opposite to the connecting member, and the light-emitting unit is arranged on the light source portion. The distance between the light-emitting unit and the center axis of the optical route is greater than the radius of the objective lens unit. The cover body is annularly arranged around the optical route. The light source portion is located at an outer periphery of the cover body so that the light-emitting unit is arranged at the outer periphery of the cover body. The battery activates the light-emitting unit to generate a light beam, and the light beam irradiates toward the center axis of the optical route. Accordingly, the light source set can provide light to the sample so as to make the observed magnified image bright and clear, thereby improving the experience of observing samples.

BRIEF DESCRIPTION OF THE DRAWINGS

The disclosure will become more fully understood from the detailed description and accompanying drawings, which are given for illustration only, and thus are not limitative of the present disclosure, and wherein:

FIG. 2A and FIG. 2B are different schematic diagrams of the light source set according to the embodiment of this disclosure, wherein FIG. 2A shows the front perspective view of the light source set, and FIG. 2B shows the rear perspective view of the light source set;

FIG. 4B is a schematic diagram showing the light source set according to the embodiment of this disclosure, wherein the first light-emitting elements and the second light-emitting elements are all turned on;

DETAILED DESCRIPTION OF THE DISCLOSURE

The present disclosure will be apparent from the following detailed description, which proceeds with reference to the accompanying drawings, wherein the same references relate to the same elements.

Figure 1A:
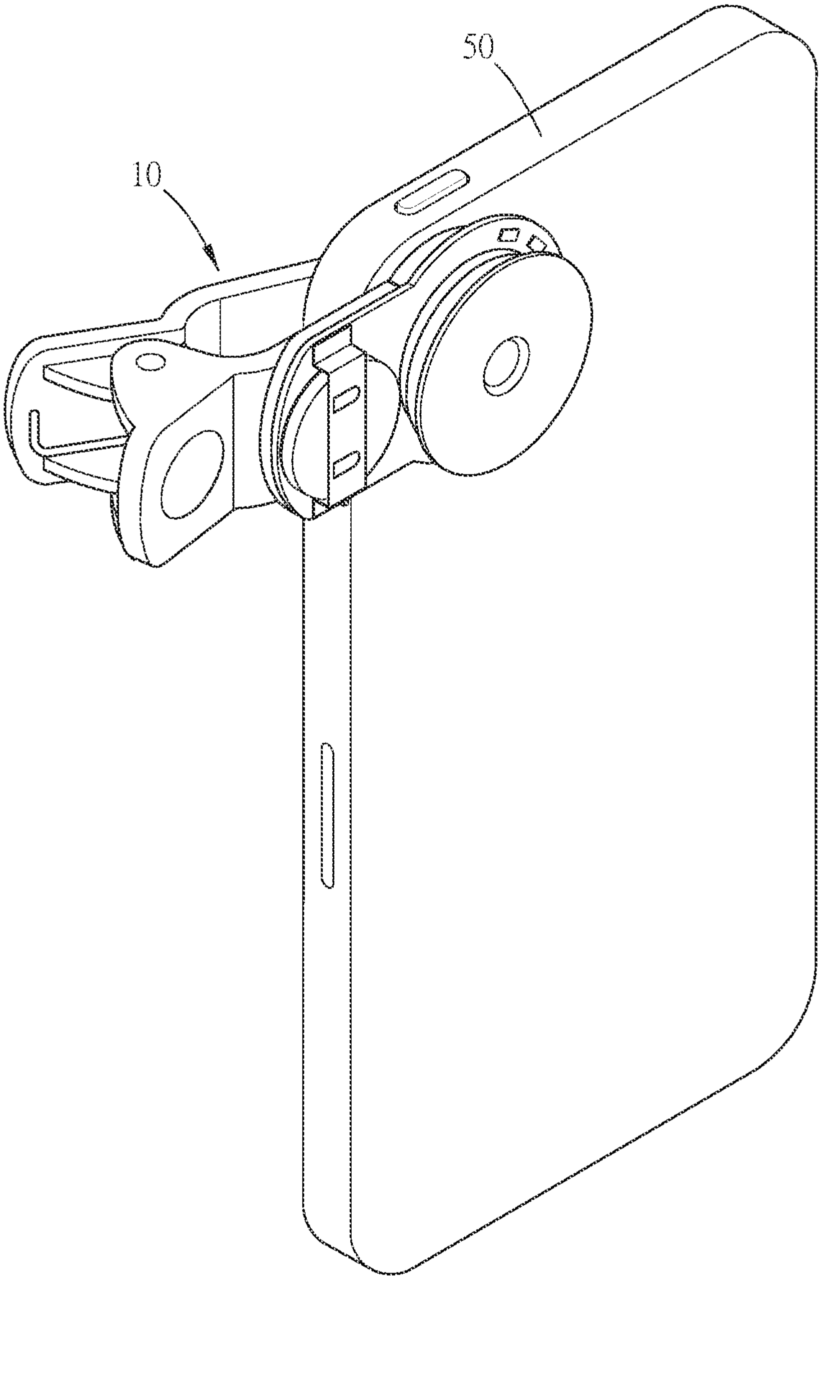
FIG. 1A is a schematic diagram showing a microscope device according to an embodiment of this disclosure, which cooperates with a smart communication device.
Figure 1B:
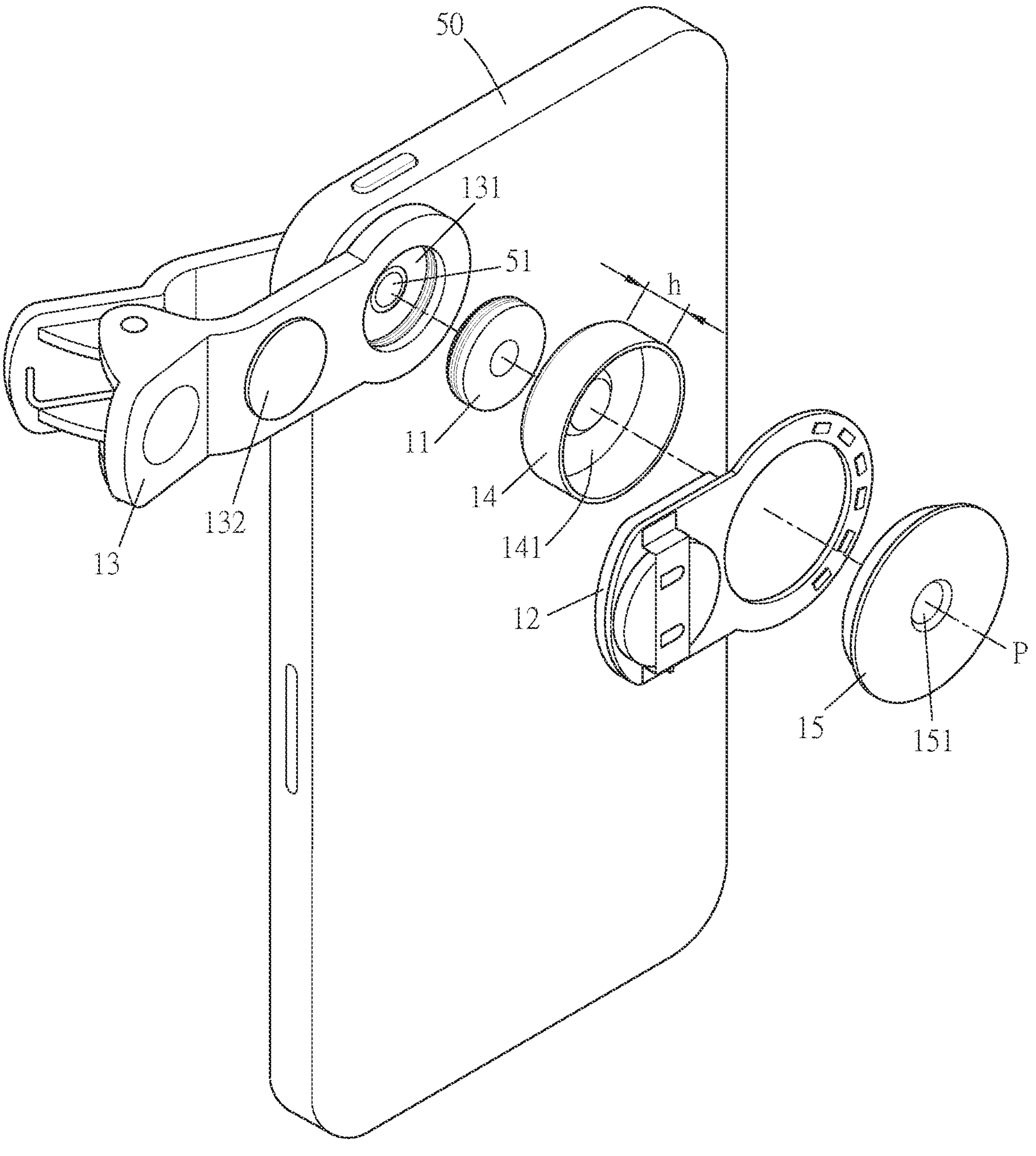
FIG. 1B is an exploded view of the microscope device of FIG. 1A.

FIG. 1A is a schematic diagram showing a microscope device 10 according to an embodiment of this disclosure, which cooperates with a smart communication device 50, and FIG. 1B is an exploded view of the microscope device 10 of FIG. 1A.

In this embodiment, the microscope device 10 includes an objective lens unit 11 and a light source set 12, and the smart communication device 50 includes an image capturing module 51. The microscope device 10 is cooperated with the image capturing module 51 for observing a sample. As shown in FIGS. 1A and 1B, the image capturing module 51, the objective lens unit 11 and the sample are sequentially located on an optical route P. In general, the combination of the microscope device 10 and the image capturing module 51 of the smart communication device 50 can carry out the portable microscope device, and the distance between the sample and the objective lens unit 11 of the microscope device 10 can be extremely small.

As shown in FIGS. 1A and 1B, the microscope device 10 further includes a stationary fixture 13, and the stationary fixture 13 has a through hole 131 also arranged on the optical route P. The objective lens unit 11 is correspondingly fixed in the through hole 131. In this embodiment, the objective lens unit 11 can be correspondingly arranged in the through hole 131 by screwing. Specifically, the objective lens unit 11 has a housing, a convex lens is provided in the center of the housing, and the outer side wall of the housing has a thread structure, for example. The inner wall of the through hole 131 has a corresponding thread structure, so that the objective lens unit 11 can be screwed into the through hole 131 and fixed in the through hole 131.

In addition, as shown in FIGS. 1A and 1B, the microscope device 10 further includes a cover body 14, which is correspondingly disposed between the objective lens unit 11 and the sample and adjacent to the through hole 131 of the stationary fixture 13. The cover body 14 has an opening 141 facing the sample. In practice, the cover body 14 can be used to cover the sample, which can not only limit the sample within the range of the opening 141, but also flatten the sample surface to facilitate observation. For example, when the sample is a liquid sample, the user can move the cover body 14 to cover the liquid sample so as to prevent the sample from flowing and make it easier to observe the sample. In another case, when the sample is a living microorganism (e.g. existing in water), the user can move the cover body 14 on the microorganism sample (usually together with the water droplet containing microorganisms), so as to prevent the microorganism sample from leaving the observation range and make it easier to observe the microorganism sample. In another case, when the sample is an object surface (e.g. a cloth surface), the user can put the cover body 14 on the cloth surface. Accordingly, the cover body 14 can be used to press the cloth surface so that the cloth surface can be presented as a flat surface, thereby making the cloth surface be observed easily. It should be noted that the above usage aspects are only examples and are not to limit the scope of the present disclosure.

Moreover, by putting the cover body 14 on the sample, the distance between the objective lens unit 11 and the sample can also be ensured (this distance is usually equal to the focal length of the objective lens unit 11). Generally speaking, the height h of the cover body 14 can define the distance between the objective lens unit 11 and the sample. This design allows users to observe samples more quickly and conveniently without spending time to adjust the sample on the focus.

In this embodiment, the microscope device 10 further includes a cap body 15 for capping the opening 141 of the cover body 14. The center portion of the cap body 15 is configured with a recess 151 for accommodating the sample. For example, when the sample is a liquid sample or the sample exists in a liquid solution (e.g. water droplet containing microorganism sample), the user can cap the opening 141 of the cover body 14 with the cap body 15 and then place the water droplet containing microorganism sample in the recess 151, thereby placing and limiting the microorganism sample in the recess 151 so as to observe the microorganism sample easily. It should be noted that the above usage aspects are only examples and are not to limit the scope of the present disclosure.

As shown in FIGS. 1A, 1B, 2A and 2B, the light source set 12 includes a circuit substrate 121, a battery 123, and a light-emitting unit. The circuit substrate 121 has a power source portion 124 and a light source portion 125 electrically connected to the power source portion 124. A connecting member 126 is arranged at one side of the power source portion 124, and the battery 123 is arranged at another side of the power source portion 124 opposite to the connecting member 126. The light-emitting unit is arranged on the light source portion 124, and the distance between the light-emitting unit and a center axis of the optical route P is greater than the radius of the objective lens unit 11. The battery 123 activates the light-emitting unit to generate a light beam, and the light beam irradiates toward the center axis of the optical route P. To be noted, as shown in FIGS. 1A and 1B, since the light source set 12 of this embodiment is located between the objective lens unit 11 and the sample during implementation, the light beam generated by the light source set 12 can be reflected and irradiated to the sample and the objective lens unit 11 respectively, thereby resulting the observed sample with obvious three-dimensionality.

In this embodiment, the microscope device 10 is used in cooperating with the image capturing module 51. The light beam can be reflected and/or refracted and then irradiate the sample. After being reflected by the sample, the light beam passes through the objective lens unit 11 and enters the image capturing module 51. To be noted, the light beam generated by the light-emitting unit can also directly irradiate the sample, and this embodiment is not limited thereto.

Figure 5A:
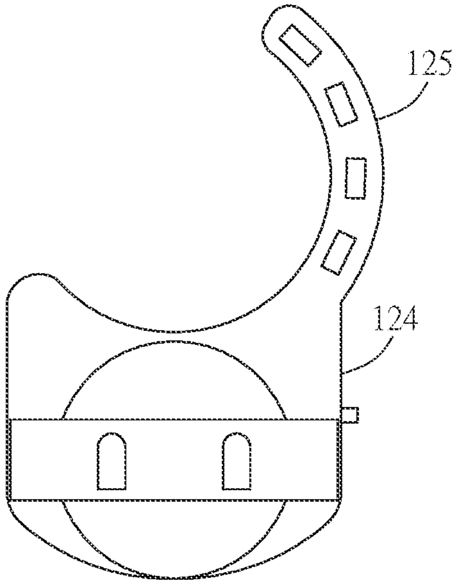
FIGS. 5A to 5D are schematic diagrams showing the light source set according to the embodiment of this disclosure, wherein the light source portions of the light source sets have different designs.

In addition, as shown in FIGS. 1A to 2B, the light source portion 125 of the light source set 12 has an annular structure and is disposed on the outer periphery of the cover body 14. The light-emitting unit includes a plurality of light-emitting elements 122 separately arranged on one side of the light source portion 125. In one example, the light source portion 125 with the annular shape is telescoped on the outer peripheral edge of the cover body 14 from the upper side of the cover body 14 in a direction parallel to the axial direction of the cover body 14. In other aspects, the light source portion 125 of the light source set 12 can, for example, have an arc-shaped structure (as shown in FIG. 5A), and the light source portion 125 with the arc shape can approach toward the outer periphery of the cover body 14 in a lateral direction of the cover body 14, which is perpendicular to the axial direction of the cover body 14. To be noted, the above aspects are only examples and are not to limit the scope of the present disclosure. In another embodiment, the light-emitting unit may include at least one light-emitting element and at least one light guiding element. The light-emitting element emits the light beam into the light guiding element, and then the guiding element outputs the light beam.

In this embodiment, the circuit substrate 121 is configured with a first connecting member 126, and the stationary fixture 13 is configured with a second connecting member 132, so that the light source set 12 can be fixed to the stationary fixture 13 by the first connecting member 126 and the second connecting member 132. Specifically, referring to FIGS. 2A and 2B, the first connecting member 126 is provided on the power source portion 124, and the battery 123 and the first connecting member 126 are respectively located on opposite side surfaces of the power source portion 124. In addition, the position of the second connecting member 132 corresponds to the first connecting member 126. In this embodiment, the first connecting member 126 is a magnetic member, and the second connecting member 132 is a metal member. Therefore, as shown in FIGS. 1A and 1B, when the user telescopes the annular light source portion

125 on the cover body 14 and approaches the power source portion 124 towards the stationary fixture 13, the first connecting member 126 can be magnetically attracted to the second connecting member 132, thereby allowing the light source set 12 to be connected and fixed on the stationary fixture 13. It should be noted that the above descriptions are only examples and are not intended to limit the scope of the present disclosure. For example, in other embodiments, the first connecting member 126 can be a metal member and the second connecting member 132 can be a magnetic member, or both the first connecting member 126 and the second connecting member 132 can be magnetic members. In addition, in other embodiments, the first connecting member 126 and the second connecting member 132 can respectively be a clamping structure, a hooking structure, an engaging structure, a fastening structure, an adhesive structure (e.g. Velcro felt), or any kind of structure that can connect the first connecting member 126 to the second connecting member 132. The present disclosure is not limited thereto.

Figure 2A:
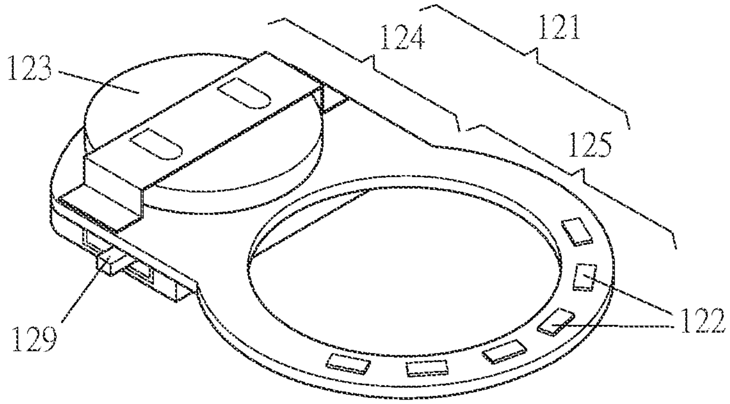
Figure 2B:
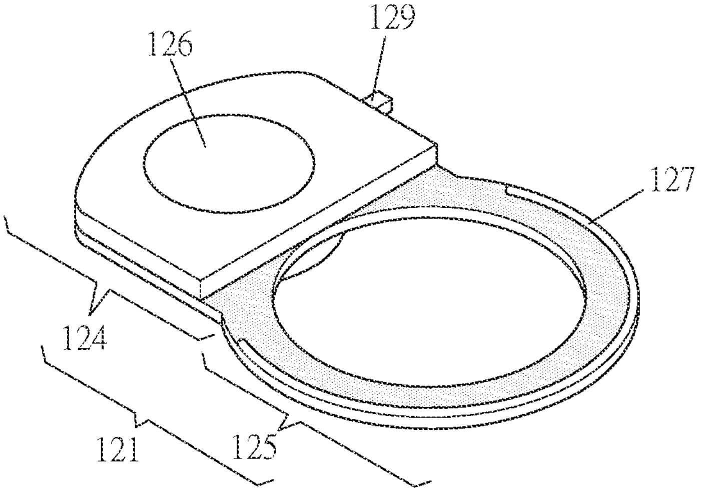

Moreover, the circuit substrate 121 can be further configured with a touch-control switch 127 to control and switch the light-emitting elements 122. For example, a plurality of wires can be provided on or inside the circuit substrate 121 and are electrically connect the light-emitting elements 122 to the battery 123. The touch-control switch 127 and the light-emitting elements 122 are respectively arranged on opposite sides of the light source portion 125. Specifically, the light-emitting elements 122 are arranged on one side of the light source portion 125, and the touch-control switch 127 is arranged on the opposite side of the light source portion 125. The touch-control switch 127 is provided along the edge of the light source portion 125, and the total length of the touch-control switch 127 is greater than or equal to 1 cm. In this embodiment, as shown in FIGS. 2A and 2B, in addition to the plurality of light-emitting elements 122, the light source portion 125 can be configured with a touch-control switch 127, which is arranged on a surface of the light source portion 125. In this case, the light-emitting elements 122 and the touch-control switch 127 are respectively disposed on two opposite surfaces of the light source portion 125. For example, the touch-control switch 127 is a metal layer provided along the edge of the light source portion 125. In practice, the user can contact the touch-control switch 127 to turn on or off the light-emitting elements 122.

Figure 2C:
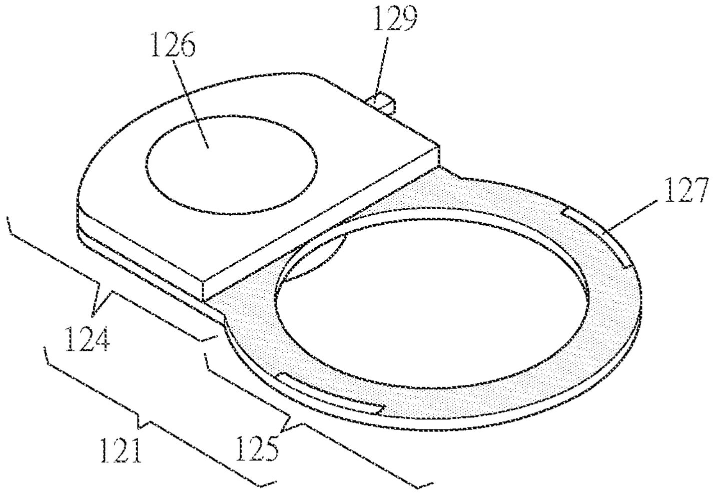
FIG. 2C is a rear perspective view of the light source set of another aspect of the embodiment.

In another embodiment, as shown in FIG. 2C, the touch-control switch 127 includes, for example, two metal layers provided along the edge of the light source portion 125, and the metal layers are respectively located at two opposite ends of the light source portion 125. The length of each metal layer (the touch-control switch 127) is about 1 cm. In practice, the user must contact both of the two metal layers (the touch-control switches 127) at the same time for turning on or off the light-emitting elements 122.

Figure 3A:
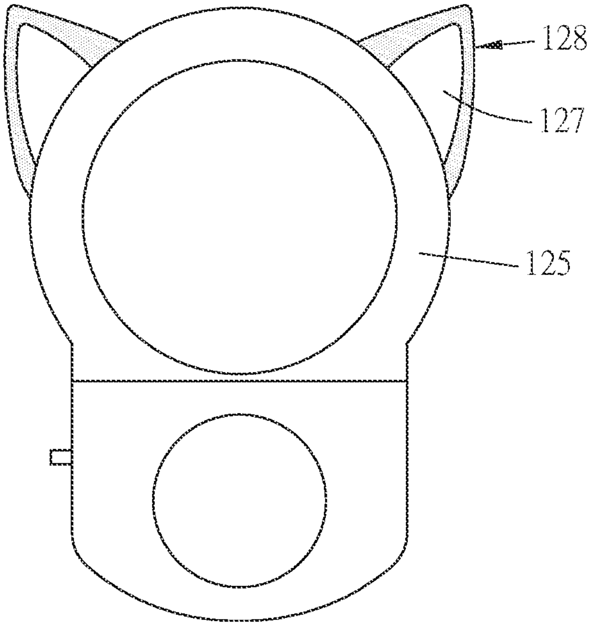
FIG. 3A is a schematic diagram showing the light source set according to another embodiment of this disclosure, wherein the light source set has a kitten shape.
Figure 3B:
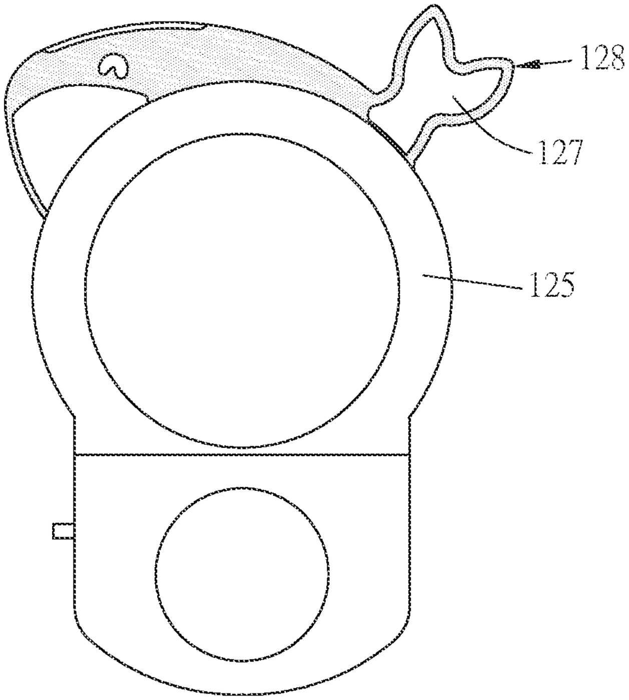
FIG. 3B is a schematic diagram showing the light source set according to another embodiment of this disclosure, wherein the light source set has a shark shape.

In another embodiment, the circuit substrate 121 can further include a flange 128, and the touch-control switch 127 is disposed on one side or both sides of the flange 128. As shown in FIG. 3A, two flanges 128 (kitten-ear shape) are disposed on the outer periphery of the light source portion 125. The configuration of the flange(s) 128 not only allows the user to touch and control the light-emitting elements 122 more conveniently, but also allows the circuit substrate 121 or the light source portion 125 to assume a specific shape by cleverly designing the shape of the flange(s) 128. The specific shape of the circuit substrate 121 or the light source portion 125 can be, for example, a kitten shape (as shown in FIG. 3A), a killer whale shape (as shown in FIG. 3B), etc.

With reference to FIGS. 2A and 2B, in this embodiment, the circuit board 121 can further include a power switch 129 for controlling the power output of the battery 123. Therefore, when the power switch 129 is switched to the off state, no matter how the user touches the touch-control switch 127, the light-emitting elements 122 will not be activated at all. Only when the power switch 129 is switched to the on state, the light emitting elements 122 can be turned on or off by touching the touch-control switch(s) 127.

Figure 4A:
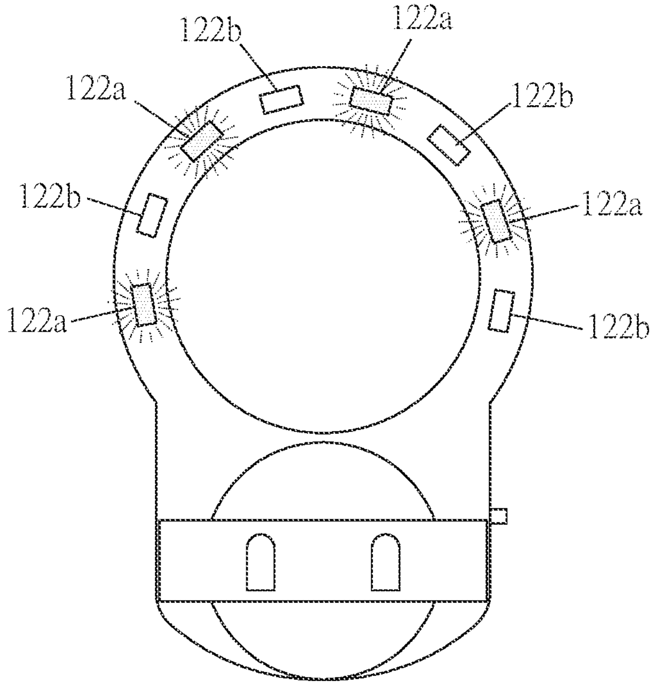
FIG. 4A is a schematic diagram showing the light source set according to the embodiment of this disclosure, wherein the first light-emitting elements are turned on, and the second light-emitting elements are turned off.
Figure 4B:
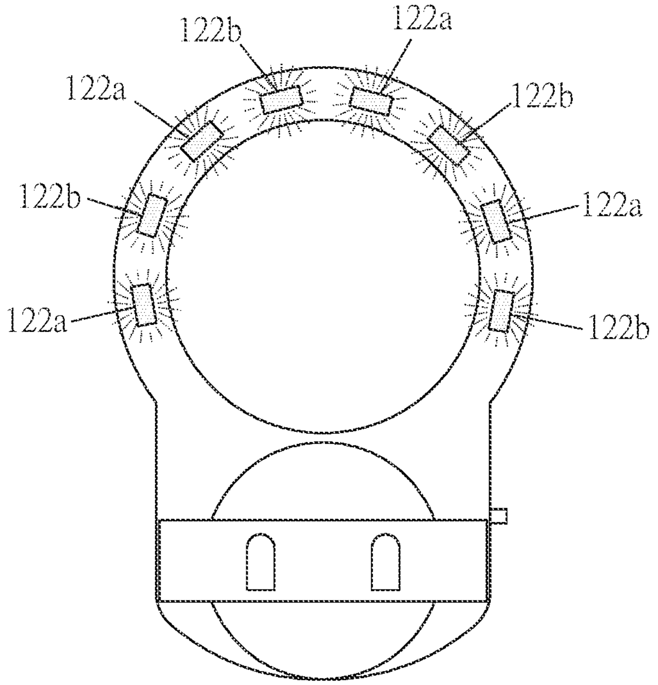

In addition, in this embodiment, the light-emitting elements 122 can be divided into multiple groups. For example, the light-emitting elements 122 can be divided into a group of first light-emitting elements 122*a* and a group of second light-emitting elements 122*b*. The group of first light-emitting elements 122*a* are turned on or off simultaneously, and the group of second light-emitting elements 122*b* are turned on or off simultaneously. As shown in FIG. 4A, when the user touches the touch-control switch 127 for the first time, the four first light-emitting elements 122*a* will be turned on to emit light. Then, as shown in FIG. 4B, when the user touches the touch-control switch 127 again, the four second light-emitting elements 122*b* will be turned on to emit light. At this time, all eight light-emitting elements will emit light at the same time. Afterwards, when the user touches the touch-control switch 127 for the third time, all eight light-emitting elements will be turned off at the same time. Through the above control method, the light source set 12 can emit light of different brightness (two-stage lighting mode). In addition, different groups of light-emitting elements can emit lights with different color temperatures. For example, the first light-emitting elements 122*a* can emit the light with a color temperature of 6500K, and the second light-emitting elements 122*b* can emit light with a color temperature of 2800K. Moreover, the group of first light-emitting elements 122*a* can emit light independently, and the group of second light-emitting elements 122*b* can also emit light independently. This disclosure is not limited thereto.

Figure 5B:
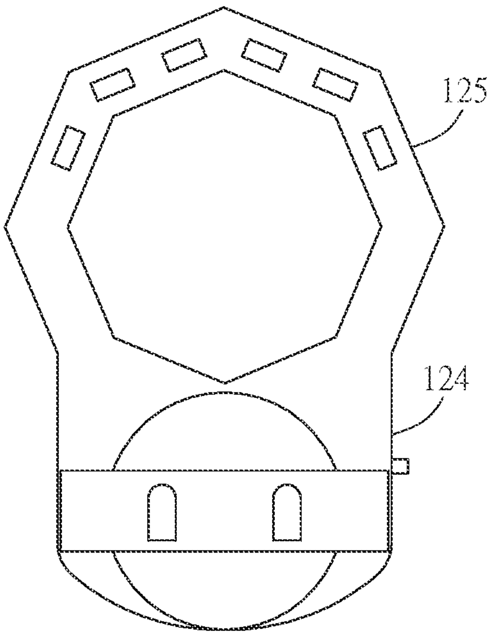
Figure 5C:
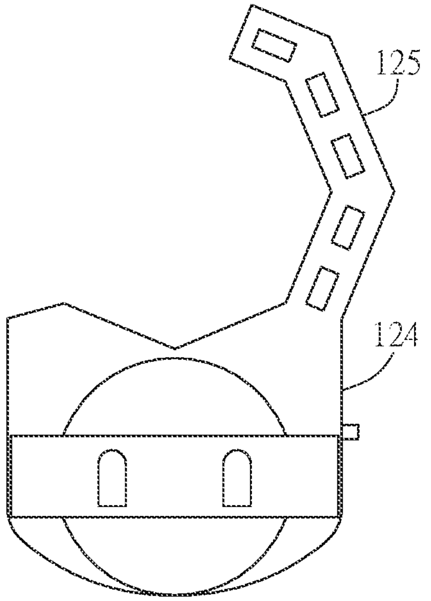

As mentioned above, in addition to the aspect of the light source portion 125 with the annular shape in the above embodiment, the light source portion 125 may have any of other suitable shapes, such as arc shape, polygonal curved shape, or polygonal shape, which will be illustrated below. As shown in FIG. 5A, the light source portion 125 is an arc-shaped structure (not a closed annular structure) extending outwardly from one side of the power source portion 124. The arc-shaped light source portion 125 can be disposed against the outer periphery of the cover body 14 (i.e., disposed around the optical route P). In practice, the light source portion 125 with the arc shape can approach toward the outer periphery of the cover body 14 in a lateral direction of the cover body 14, which is perpendicular to the axial direction of the cover body 14. As shown in FIG. 5B, the light source portion 125 is a polygonal structure extending outwardly from one side of the power source portion 124. The light source portion 125 with the polygonal shape can be placed around the outer periphery of the cover body 14 (i.e., disposed around the optical route P). As shown in FIG. 5C, the light source portion 125 is a polygonal curved structure (not a closed polygonal structure) extending outwardly from one side of the power source portion 124. The light source portion 125 with the polygonal curved shape can be disposed against the outer periphery of the cover body 14 (i.e., disposed around the optical route P). It should be noted that the above-mentioned shapes are only examples and are not to limit the scope of the present disclosure. In addition, the cover body 14 can also have different shapes and designs, and the shape of the light source portion 125 can match the cover body 14 of different shapes.

Figure 5D:
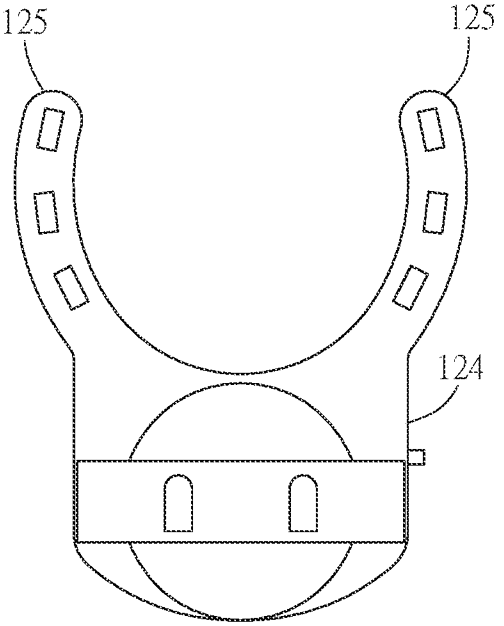
Figure 5E:
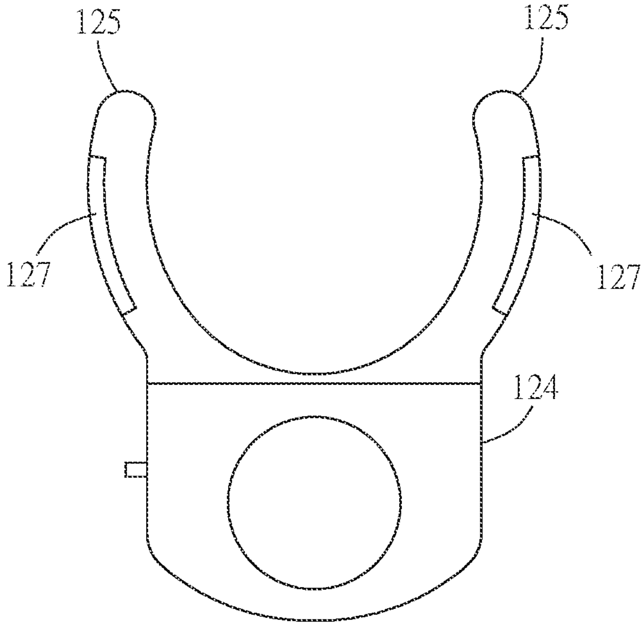
FIG. 5E is a schematic diagram showing another side view of the light source set of FIG. 5D.

In addition, the circuit substrate 121 may include a plurality of light source portions 125. As shown in FIG. 5D, the circuit substrate 121 includes two light source portions 125, each of which has an arc-shaped structure (not a closed annular structure) and extends outwardly from one side of the power source portion 124 so as to forming, for example, a clamp-shaped structure. The clamp-shaped light source portions 125 can be clamped on the sides of the cover body 14 (i.e., disposed around the optical route P). In this embodiment, as shown in FIG. 5E, the touch-control switches 127 and the light-emitting elements 122 are respectively disposed on opposite sides of the light source portions 125. That is, the light-emitting elements 122 are disposed on one side surface of the light source portions 125, and the touch-control switches 127 are disposed on the other side surface of the light source portions 125 opposite to the light-emitting elements 122. The two touch-control switches 127 are respectively provided along the periphery of the two light source portions 125, and the total length of the two touch-control switches 127 is greater than or equal to 1 cm. In practice, for example, the user can touch two touch-control switches 127 at the same time so as to turn on or off the light-emitting elements 122. To be noted, the lengths of the two touch-control switches 127 shown in FIG. 5E may be different, as long as the total length of the touch-control switches 127 is greater than or equal to 1 cm.

In addition, in this embodiment, the light source portion 125 can be a flexible substrate, so that the light source portion 125 can be bent arbitrarily to match the shape of the cover body 14 in different designs, and then be disposed around the outer periphery of the cover body 14.

In another embodiment, the above-mentioned light source set 12 can also be applied to the sample independently. For example, as shown in FIG. 5D, the light source set 12 can be directly clamped on the sample (such as a leather bag) through its clamp-shaped light source portions 125 instead of being attached to the stationary fixture 13. In this case, the light source set 12 can provide light to the surface of the sample to be observed. The sample can be an object of any shape and/or any material, and can be clamped by the light source portions 125. This disclosure in not limited thereto.

In summary, the microscope device of this disclosure includes an objective lens unit, a light source set, and a cover body. The light source set includes a circuit substrate, a battery and a light-emitting unit. The circuit substrate has a power source portion and a light source portion electrically connected to the power source portion, and a connecting member is arranged at one side of the power source portion. The battery is arranged at another side of the power source portion opposite to the connecting member, and the light-emitting unit is arranged on the light source portion. The distance between the light-emitting unit and the center axis of the optical route is greater than the radius of the objective lens unit. The cover body is annularly arranged around the optical route. The light source portion is located at an outer periphery of the cover body so that the light-emitting unit is arranged at the outer periphery of the cover body. The battery activates the light-emitting unit to generate a light beam, and the light beam irradiates toward the center axis of the optical route. Accordingly, the light source set can provide light to the sample so as to make the observed magnified image bright and clear, thereby improving the experience of observing samples.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A microscope device for observing a sample, wherein the microscope device and the sample are located on an optical route, the microscope device comprising:

an objective lens unit;

a light source set comprising a circuit substrate, a battery and a light-emitting unit, wherein the circuit substrate has a power source portion and at least one light source portion electrically connected to the power source portion, a connecting member is arranged at one side of the power source portion, the battery is arranged at another side of the power source portion opposite to the connecting member, the light-emitting unit comprises a plurality of light-emitting elements separately arranged on the light source portion, and a distance between the light-emitting unit and a center axis of the optical route is greater than a radius of the objective lens unit, the light source set is located between the objective lens unit and the sample;

a cover body annularly arranged around the optical route, wherein the light source portion has an arc shape or an annular shape, the light source portion is located at an outer periphery of the cover body so that the light-emitting elements of the light-emitting unit are arranged at least a part of the outer periphery of the cover body, a height of the cover body defines a distance between the objective lens unit and the sample, and one end of the cover body facing toward the sample is configured with an opening; and a stationary fixture having a through hole, wherein the objective lens unit is fixed in the through hole;

wherein, the battery activates the light-emitting elements of the light-emitting unit to generate a light beam, and the light beam irradiates toward the center axis of the optical route, wherein the light beam is reflected and irradiated to the sample and then reflected to the objective lens unit, wherein the connecting member is connected to the cover body or the stationary fixture by magnetics, clipping, or engaging.

2. The microscope device of claim 1, further comprising:

a cap body configured to cap the opening of the cover body, wherein the sample is disposed at one side of the cap body.

3. The microscope device of claim 1, wherein the light source portion with the arc shape approaches toward the outer periphery of the outer periphery of the cover body in a lateral direction of the cover body, which is perpendicular to an axial direction of the cover body; or wherein the light source portion with the annular shape is telescoped on the outer periphery of the cover body from top of the cover body in a direction parallel to the axial direction of the cover body.

4. The microscope device of claim 1, wherein the light-emitting unit further comprises at least one light guiding element, the light-emitting element emit the light beam into the at least one light guiding element, and then the at least one light guiding element outputs the light beam.

5. The microscope device of claim 1, wherein the light-emitting elements are divided into multiple groups, and the multiple groups of the light-emitting elements are turned on/off individually.

6. The microscope device of claim 1, wherein the circuit substrate is configured with a touch-control switch, the touch-control switch is arranged at a periphery of the light source portion, and a total length of the touch-control switch is greater than or equal to 1 cm.

7. The microscope device of claim 6, wherein the circuit substrate comprises a flange protruding from the light source portion, and the touch-control switch is arranged on the flange.

8. The microscope device of claim 1, wherein the additional light source set further comprises a power switch electrically connected to the battery for controlling the battery to output electric power to activate the light-emitting unit.

9. An additional light source set, which is applied to a microscope device for observing a sample, wherein the microscope device comprises an objective lens unit for observing the sample and a cover body, and the microscope device and the sample are located on an optical route, the additional light source set comprising:

a circuit substrate having a power source portion and a light source portion electrically connected to the power source portion, wherein a connecting member is arranged at one side of the power source portion, and the light source portion is located at an outer periphery of the cover body;

a battery arranged at another side of the power source portion opposite to the connecting member; and a light-emitting unit arranged on the light source portion, wherein a distance between the light-emitting unit and a center axis of the optical route is greater than a radius of the objective lens unit;

wherein, the battery activates the light-emitting unit to generate a light beam, and the light beam irradiates toward the center axis of the optical route, wherein the circuit substrate is configured with a touch-control switch, the touch-control switch is arranged at a periphery of the light source portion, and a total length of the touch-control switch is greater than or equal to 1 cm.

10. The additional light source set of claim 9, wherein the light source portion of the circuit substrate has an arc shape or an annular shape, the light-emitting unit comprises at least one light-emitting element and at least one light guiding element, the at least one light-emitting element emits the light beam into the at least one light guiding element, and then the at least one light guiding element outputs the light beam.

11. The additional light source set of claim 9, wherein the light source portion of the circuit substrate has an arc shape or an annular shape, the light source portion with the arc shape or the annular shape is arranged at the outer periphery of the cover body, and the light-emitting unit comprises a plurality of light-emitting elements separately disposed at one side of the light source portion.

12. The additional light source set of claim 11, wherein the light source portion with the arc shape approaches toward the outer periphery of the cover body in a lateral direction of the cover body, which is perpendicular to an axial direction of the cover body; or wherein the light source portion with the annular shape is telescoped on the outer periphery of the cover body from top of the cover body in a direction parallel to the axial direction of the cover body.

13. The additional light source set of claim 11, wherein the light-emitting elements are divided into multiple groups, and the multiple groups of the light-emitting elements are turned on/off individually.

14. The additional light source set of claim 9, wherein the circuit substrate comprises a flange protruding from the light source portion, and the touch-control switch is arranged on the flange.

15. The additional light source set of claim 9, further comprising a power switch electrically connected to the battery for controlling the battery to output electric power to activate the light-emitting unit.

* * * * *